(12) United States Patent
Son et al.

(10) Patent No.: US 12,554,102 B2
(45) Date of Patent: Feb. 17, 2026

(54) IMAGING LENS SYSTEM

(71) Applicant: SAMSUNG ELECTRO-MECHANICS CO., LTD., Suwon-si (KR)

(72) Inventors: Ju Hwa Son, Suwon-si (KR); Hyo Jin Hwang, Suwon-si (KR); Yong Joo Jo, Suwon-si (KR); Sang Hyun Jang, Suwon-si (KR); Jong Gi Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/460,957

(22) Filed: Sep. 5, 2023

(65) Prior Publication Data

US 2024/0004164 A1   Jan. 4, 2024

Related U.S. Application Data

(63) Continuation of application No. 17/012,244, filed on Sep. 4, 2020, now Pat. No. 11,782,241.

(30) Foreign Application Priority Data

Nov. 21, 2019  (KR) .................. 10-2019-0150653

(51) Int. Cl.
*G02B 13/00*   (2006.01)
*G02B 9/64*    (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 9,523,841 | B1 | 12/2016 | Chen |
| 11,573,405 | B2 | 2/2023 | Li et al. |
| 2017/0329108 | A1 | 11/2017 | Hashimoto |
| 2018/0074299 | A1 | 3/2018 | Huang |
| 2018/0106988 | A1 | 4/2018 | Chen |
| 2018/0239115 | A1 | 8/2018 | Hsu et al. |
| 2019/0056568 | A1 | 2/2019 | Huang |
| 2019/0107690 | A1 | 4/2019 | Wenren |

(Continued)

FOREIGN PATENT DOCUMENTS

| CN | 107643586 A | 1/2018 |
|---|---|---|
| CN | 107678140 A | 2/2018 |

(Continued)

OTHER PUBLICATIONS

CN-107703608-A, translation (Year: 2018).*

(Continued)

*Primary Examiner* — Wen Huang
(74) *Attorney, Agent, or Firm* — NSIP Law

(57) ABSTRACT

An imaging lens system includes a first lens having refractive power, a second lens having refractive power, a third lens having refractive power, a fourth lens having refractive power, a fifth lens having refractive power, a sixth lens having refractive power and having a convex object-side surface, a seventh lens having refractive power, and an eighth lens having refractive power, wherein a field of view (FOV) of the imaging lens system is 78-85 degrees.

5 Claims, 10 Drawing Sheets

(56) References Cited

U.S. PATENT DOCUMENTS

| | | |
|---|---|---|
| 2019/0121098 A1 | 4/2019 | Zhou et al. |
| 2019/0204557 A1 | 7/2019 | Jhang et al. |
| 2020/0026042 A1 | 1/2020 | Teraoka |
| 2020/0174227 A1 | 6/2020 | Nitta |
| 2020/0201002 A1 | 6/2020 | Xu et al. |
| 2020/0393648 A1* | 12/2020 | Lin .................. G02B 13/0045 |
| 2020/0393652 A1* | 12/2020 | Kuo .................. G02B 13/0045 |
| 2021/0018728 A1 | 1/2021 | Li et al. |
| 2021/0096329 A1 | 4/2021 | Lv et al. |
| 2021/0096330 A1 | 4/2021 | Huang et al. |
| 2021/0109323 A1 | 4/2021 | Dai et al. |
| 2021/0109325 A1 | 4/2021 | Lv et al. |
| 2021/0255431 A1 | 8/2021 | Zhang et al. |
| 2021/0364754 A1 | 11/2021 | You et al. |
| 2021/0396955 A1* | 12/2021 | Okano ............... G02B 13/0045 |

FOREIGN PATENT DOCUMENTS

| | | | | |
|---|---|---|---|---|
| CN | 107703608 A | * | 2/2018 | ............ G02B 13/18 |
| CN | 107703609 A | | 2/2018 | |
| CN | 107741630 A | | 2/2018 | |
| CN | 108681040 A | | 10/2018 | |
| CN | 109343205 A | | 2/2019 | |
| CN | 109407282 A | | 3/2019 | |
| CN | 109507786 A | | 3/2019 | |
| CN | 209297019 U | | 8/2019 | |
| CN | 110456476 A | | 11/2019 | |
| JP | 2017-116594 A | | 6/2017 | |
| JP | 2020-13082 A | | 1/2020 | |

OTHER PUBLICATIONS

Huang, "The image capturing lens assembly and imaging device" Machine Translation of CN 109407282 A, Mar. 1, 2019 (pp. 1-25).
Korean Office Action issued on May 10, 2021 in counterpart Korean Patent Application No. 10-2019-0150653. (8 pages in English)(5 pages in Korean).
Chinese Office Action issued on Dec. 13, 2021 in counterpart Chinese Patent Application No. 202011229271.6 (7 pages in English and 7 pages in Chinese).
Korean Office Action issued on Oct. 26, 2022, in counterpart Korean Patent Application No. 10-2022-0119701 (10 pages in English, 6 pages in Korean).
Korean Office Action issued on Apr. 25, 2023, in counterpart Korean Patent Application No. 10-2022-0119701 (5 pages in English, 4 pages in Korean).
Chinese Office Action issued on Dec. 10, 2025, in counterpart Chinese Patent Application No. 202310074541.8. (8 pages in English, 12 pages in Chinese).

* cited by examiner

IMAGING LENS SYSTEM

CROSS-REFERENCE TO RELATED APPLICATION(S)

This application is a continuation of U.S. application Ser. No. 17/012,244 filed on Sep. 4, 2020, now U.S. Pat. No. 11,782,241 issued on Oct. 10, 2023, which claims benefit of priority to Korean Patent Application No. 10-2019-0150653 filed on Nov. 21, 2019, in the Korean Intellectual Property Office, the disclosures of which are incorporated herein by reference in their entireties.

BACKGROUND

1. Field

The present disclosure relates to an imaging lens system including eight lenses.

2. Description of Related Art

A small-sized camera may be mounted on a wireless terminal device. For example, a small-sized camera may be mounted on each of a front surface and a rear surface of a wireless terminal device. As such a small-sized camera may be used for various purposes, to obtain images of scenery, indoor portraits, and the like, such a small-sized camera has been required to have performance similar to that of a general camera. However, it may be difficult for a small-sized camera to implement high performance as there may be a limitation in mounting space due to a limited size of a wireless terminal device. Thus, it has been required to develop an imaging lens system which may improve performance of a small-sized camera without increasing a size of a small-sized camera.

SUMMARY

An aspect of the present disclosure is to provide an imaging lens system which may improve performance of a small-sized camera.

According to an aspect of the present disclosure, an imaging lens system includes a first lens having refractive power, a second lens having refractive power, a third lens having refractive power, a fourth lens having refractive power, a fifth lens having refractive power, a sixth lens having refractive power and having a convex object-side surface, a seventh lens having refractive power, and an eighth lens having refractive power, wherein a field of view (FOV) of the imaging lens system is 78 to 85 degrees.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
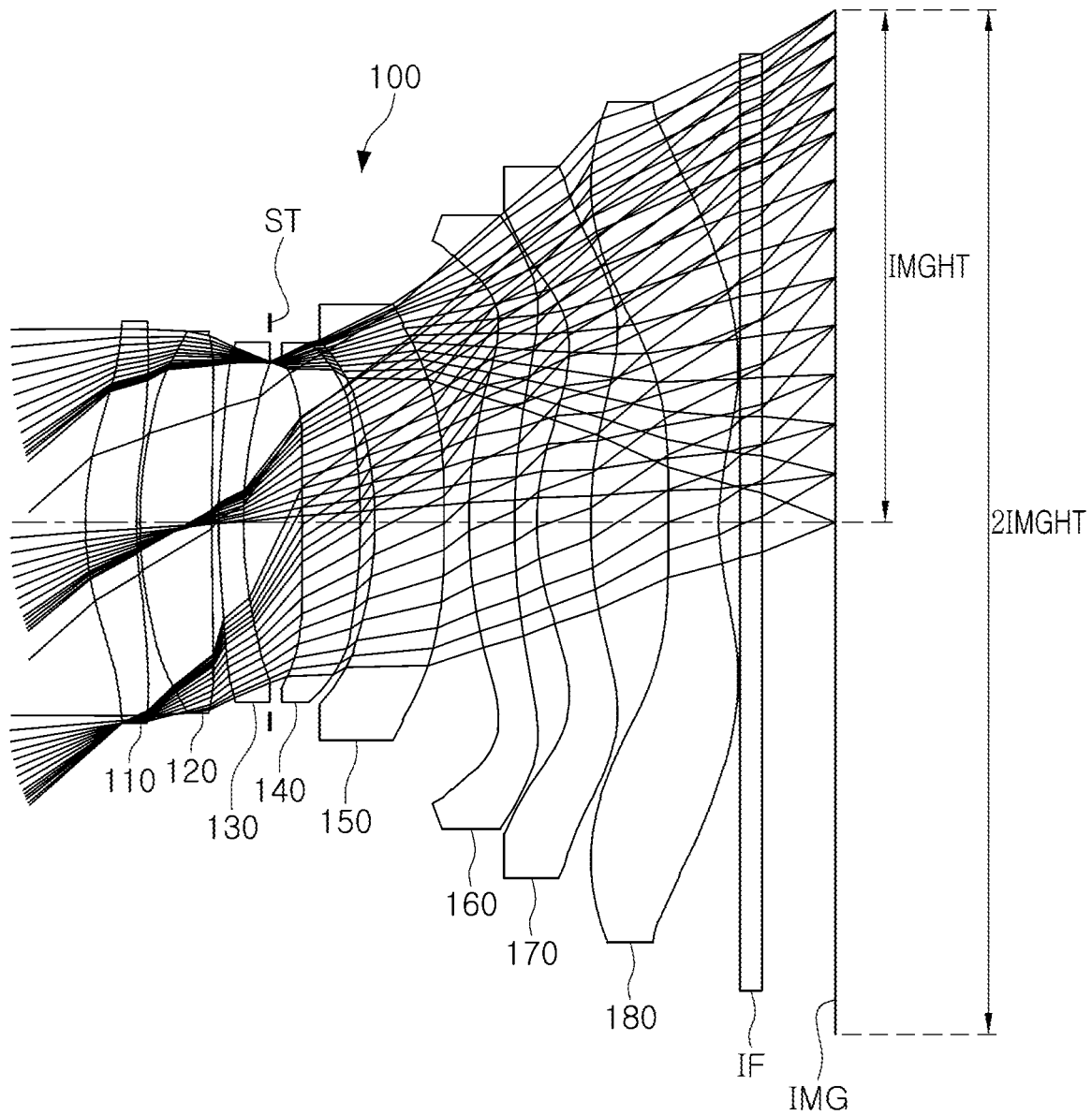
FIG. 1 is a diagram illustrating a first example of an imaging lens system.
Figure 2:
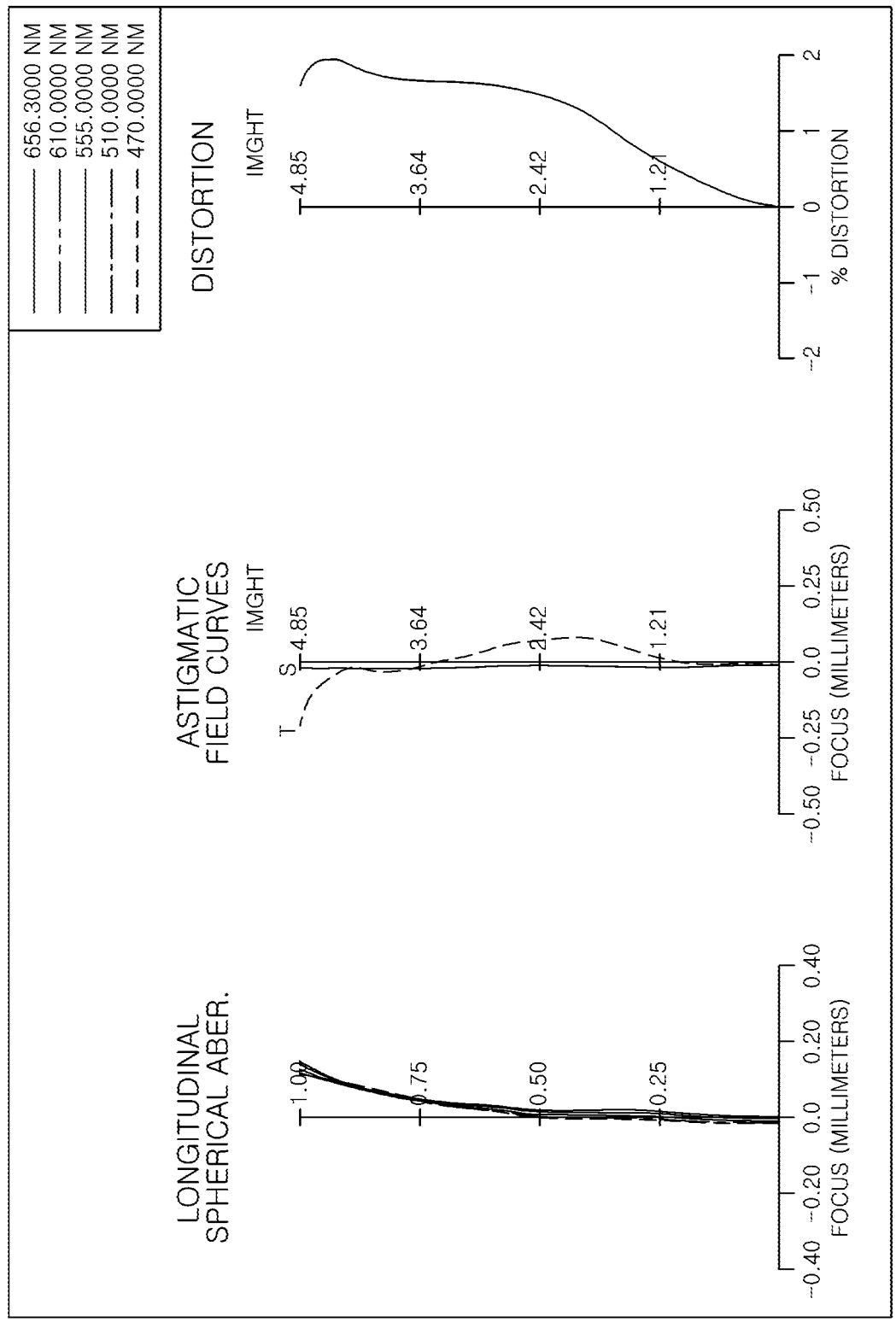
FIG. 2 is aberration curves of the imaging lens system illustrated in FIG. 1.

Hereinafter, embodiments of the present disclosure will be described as follows with reference to the attached drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

In the example embodiments, a first lens refers to a lens most adjacent to an object (or a subject), and an eighth lens refers to a lens most adjacent to an imaging plane (or an image sensor). In the example embodiments, a unit of a radius of curvature, a thickness, a TTL (a distance from an object-side surface of the first lens to an imaging plane), a 2IMGHT (a diagonal length of an imaging plane), and a focal length are indicated in millimeters (mm).

A thickness of a lens, a gap between lenses, and a TTL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

The imaging lens system may include eight lenses. For example, the imaging lens system may include a first lens, a second lens, a third lens, a fourth lens, a fifth lens, a sixth lens, a seventh lens, and an eighth lens, disposed in order from an object side. The first to eighth lenses may be disposed with a predetermined gap therebetween. For example, image-side surfaces and object-side surfaces of adjacent lenses are not in contact with each other in a paraxial region. Accordingly, even when an image-side surface of one side lens is in contact with an object-side surface of the other side lens in the diagrams, the image-side surface and the object-side surface of the two lenses are not actually in contact with each other.

The first lens may have refractive power. One surface of the first lens may be convex. For example, the first lens may have a convex object-side surface. The first lens may include an aspherical surface. For example, both surfaces of the first lens may be aspherical. The first lens may be formed of a material having high light transmissivity and excellent workability. For example, the first lens may be manufactured using a plastic material. The first lens may have a predetermined refractive index. For example, a refractive index of the first lens may be lower than 1.6. The first lens may have a predetermined Abbe number. For example, an Abbe number of the first lens may be 50 or greater. The first lens may have a predetermined focal length. For example, a focal length of the first lens may be 10 to mm.

The second lens may have refractive power. One surface of the second lens may be convex. For example, the second lens may have a convex object-side surface. The second lens may include an aspherical surface. For example, both surfaces of the second lens may be aspherical. The second lens may be formed of a material having high light transmissivity and excellent workability. For example, the second lens may be manufactured using a plastic material. The second lens may have a predetermined refractive index. For example, a refractive index of the second lens may be lower than 1.6. The second lens may have a predetermined Abbe number. For example, an Abbe number of the second lens may be 50 or greater. The second lens may have a predetermined focal length. For example, a focal length of the second lens may be 4.2 to 7.5 mm.

The third lens may have refractive power. One surface of the third lens may be convex. For example, the third lens may have a convex object-side surface. The third lens may include an aspherical surface. For example, both surfaces of the third lens may be aspherical. The third lens may be formed of a material having high light transmissivity and excellent workability. For example, the third lens may be manufactured using a plastic material. The third lens may have a refractive index greater than that of the second lens. For example, a refractive index of the third lens may be 1.6 or greater. The third lens may have a predetermined Abbe number. For example, an Abbe number of the third lens may be or lower. The third lens may have a predetermined focal length. For example, a focal length of the third lens may be −14 to −9.0 mm.

The fourth lens may have refractive power. One surface of the fourth lens may be convex. For example, the fourth lens may have a convex image-side surface. The fourth lens may include an aspherical surface. For example, both surfaces of the fourth lens may be aspherical. The fourth lens may be formed of a material having high light transmissivity and excellent workability. For example, the fourth lens may be manufactured using a plastic material. The fourth lens may have a refractive index lower than that of the third lens. For example, a refractive index of the fourth lens may be lower than 1.6. The fourth lens may have a predetermined Abbe number. For example, an Abbe number of the fourth lens may be 50 or greater. The fourth lens may have a predetermined focal length. For example, a focal length of the fourth lens may be 13 to 40 mm.

The fifth lens may have refractive power. One surface of the fifth lens may be concave. For example, the fifth lens may have a concave object-side surface. The fifth lens may include an aspherical surface. For example, both surfaces of the fifth lens may be aspherical. The fifth lens may be formed of a material having high light transmissivity and excellent workability. For example, the fifth lens may be manufactured using a plastic material. The fifth lens may have a refractive index greater than that of the fourth lens. For example, a refractive index of the fifth lens may be 1.6 or greater. The fifth lens may have a predetermined Abbe number. For example, an Abbe number of the fifth lens may be or lower. The fifth lens may have a predetermined focal length. For example, a focal length of the fifth lens may be −50 to −10 mm.

The sixth lens may have refractive power. One surface of the sixth lens may be convex. For example, the sixth lens may have a convex object-side surface. The sixth lens may have a shape having an inflection point. For example, at least one of an object-side surface and an image-side surface of the sixth lens may have an inflection point. The sixth lens may include an aspherical surface. For example, both surfaces of the sixth lens may be aspherical. The sixth lens may be formed of a material having high light transmissivity and excellent workability. For example, the sixth lens may be manufactured using a plastic material. The sixth lens may have a refractive index lower than that of the fifth lens. For example, a refractive index of the sixth lens may be lower than 1.6. The sixth lens may have a predetermined Abbe number. For example, an Abbe number of the sixth lens may be 50 or greater. The sixth lens may have a predetermined focal length. For example, a focal length of the sixth lens may be lower than −50 mm or 50 mm or greater.

The seventh lens may have refractive power. At least one surface of the seventh lens may be convex. For example, the seventh lens may have a convex object-side surface. The seventh lens may have a shape having an inflection point. For example, at least one of an object-side surface and an image-side surface of the seventh lens may have an inflection point. The seventh lens may include an aspherical surface. For example, both surfaces of the seventh lens may be aspherical. The seventh lens may be formed of a material having high light transmissivity and excellent workability. For example, the seventh lens may be manufactured using a plastic material. The seventh lens may have a refractive index greater than that of the sixth lens. For example, a refractive index of the seventh lens may be 1.6 or greater. The seventh lens may have an Abbe number lower than that of the sixth lens. For example, an Abbe number of the seventh lens may be lower than 30.

The eighth lens may have refractive power. At least one surface of the eighth lens may be concave. For example, the eighth lens may have a concave image-side surface. The eighth lens may have a shape having an inflection point. For example, at least one of an object-side surface and an image-side surface of the eighth lens may have an inflection point. The eighth lens may include an aspherical surface. For example, both surfaces of the eighth lens may be aspherical. The eighth lens may be formed of a material having high light transmissivity and excellent workability. For example, the eighth lens may be manufactured using a plastic material. The eighth lens may have a refractive index lower than that of the seventh lens. For example, a refractive index of the eighth lens may be lower than 1.6. The eighth lens may have an Abbe number greater than that of the seventh lens. For example, an Abbe number of the eighth lens may be 50 or greater. The eighth lens may have a predetermined focal length. For example, a focal length of the eighth lens may be −20 to −4.0 mm.

Each of the first to eighth lenses may include an aspherical surface as described above. An aspherical surface of the first to eighth lenses may be represented by Equation 1 as below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

In equation 1, "c" is an inverse of a radius of a curvature of a respective lens, "k" is a conic constant, "r" is a distance from a certain point on an aspherical surface of the lens to an optical axis, "A to J" are aspheric constants, "Z" (or SAG) is a height from a certain point on an aspherical surface to an apex of the aspherical surface in an optical axis direction.

The imaging lens system may further include a filter, an image sensor, and a stop. The filter may be disposed between the eighth lens and an image sensor. The filter may be configured to block light of a certain wavelength. For example, a filter may block light of infrared wavelengths. The image sensor may form an imaging plane. For example, a surface of the image sensor may form an imaging plane. The stop may be arranged to adjust the amount of light incident to the lens. For example, the stop may be disposed between the second and third lenses or between the third and fourth lenses.

The first to eighth lenses may have an effective radius in which light is substantially refracted. A size of a effective radius of each of the first to eighth lenses may vary depending on refractive power and shapes of the lenses. For example, an effective radius of an object-side surface of the second lens may be greater than an effective radius of an object-side surface and an effective radius of an image-side surface of the fourth lens.

The imaging lens system may satisfy one or more of conditional expressions as below:

TTL/2IMGHT≤0.78

$f$ number≤1.8

78≤FOV≤85

L4S1ER<L2S1ER

T8<D34

In the conditional expressions, "TTL" is a distance from an object-side surface of the first lens to an imaging plane, "2IMGHT" is a diagonal length of the imaging plane, "FOV" is a field of view of the imaging lens system, "L2S1ER" is an effective radius of an object-side surface of the second lens, "L4S1ER" is an effective radius of an object-side surface of the fourth lens, "D34" is a distance from an image-side surface of the third lens to an object-side surface of the fourth lens, and "T8" is an thickness of the eighth lens at a center of an optical axis.

The imaging lens system may further satisfy one or more of conditional expressions as below:

0.690≤TTL/2IMGHT≤0.765

$f$ number<1.765

2.7<|f1/f8|<6.2

In the conditional expressions, "f1" is a focal length of the first lens, and "f8" is a focal length of the eighth lens.

In the description below, various examples of an imaging lens system will be described.

A first example of the imaging lens system will be described with reference to FIG. 1.

The imaging lens system 100 may include a first lens 110, a second lens 120, a third lens 130, a fourth lens 140, a fifth lens 150, a sixth lens 160, a seventh lens 170 and an eighth lens 180.

The first lens 110 may have positive refractive power, and may have a convex object-side surface and a concave image-side surface. The second lens 120 may have positive refractive power, and may have a convex object-side surface and a convex image-side surface. The third lens 130 may have negative refractive power, and may have a convex object-side surface and a concave image-side surface. The fourth lens 140 may have positive refractive power, and may have a convex object-side surface and a convex image-side surface. The fifth lens 150 may have negative refractive power, and may have a concave object-side surface and a convex image-side surface. The sixth lens 160 may have negative refractive power, and may have a convex object-side surface and a concave image-side surface. An inflection point may be formed on at least one of an object-side surface and an image-side surface of the sixth lens 160. The seventh lens 170 may have positive refractive power, and may have a convex object-side surface and a concave image-side surface. An inflection point may be formed on at least one of an object-side surface and an image-side surface of the seventh lens 170. The eighth lens 180 may have negative refractive power, and a convex object-side surface and a concave image-side surface. An inflection point may be formed on at least one of an object-side surface and an image-side surface of the eighth lens 180.

The imaging lens system 100 may further include a filter IF, an image sensor IMG, and a stop ST. The filter IF may be disposed between the eighth lens 180 and the image sensor IMG. The stop ST may be disposed between the third lens 130 and the fourth lens 140.

Tables 1 and 2 list lens characteristics and aspherical values of the imaging lens system of the example embodiment.

TABLE 1

| Surface No. | Note | Radius of Curvature | Thickness/ Distance | Refractive Index | Abbe Number | Effective Radius |
|---|---|---|---|---|---|---|
| S1 | First | 2.908 | 0.476 | 1.546 | 56.093 | 1.900 |
| S2 | Lens | 3.387 | 0.030 | | | 1.871 |
| S3 | Second | 3.285 | 0.694 | 1.546 | 56.093 | 1.800 |
| S4 | Lens | −58.828 | 0.063 | | | 1.766 |
| S5 | Third | 7.581 | 0.231 | 1.678 | 19.236 | 1.700 |
| S6 | Lens (Stop) | 3.915 | 0.561 | | | 1.515 |
| S7 | Fourth | 78.965 | 0.551 | 1.546 | 56.093 | 1.564 |
| S8 | Lens | −10.780 | 0.136 | | | 1.697 |
| S9 | Fifth | −5.597 | 0.663 | 1.678 | 19.236 | 1.718 |
| S10 | Lens | −16.529 | 0.241 | | | 2.061 |
| S11 | Sixth | 4.132 | 0.433 | 1.546 | 56.093 | 2.508 |
| S12 | Lens | 3.746 | 0.209 | | | 2.900 |
| S13 | Seventh | 2.324 | 0.513 | 1.619 | 25.960 | 2.941 |
| S14 | Lens | 7.566 | 0.734 | | | 3.366 |
| S15 | Eighth | 21.462 | 0.481 | 1.546 | 56.093 | 3.807 |
| S16 | Lens | 2.355 | 0.203 | | | 3.969 |
| S17 | Filter | infinity | 0.210 | 1.518 | 64.197 | 4.366 |
| S18 | | infinity | 0.690 | | | 4.428 |
| S19 | Imaging Plane | infinity | 0.010 | | | 4.881 |

TABLE 2

| Surface No. | K | A | B | C | D | E | F | G | H | J |
|---|---|---|---|---|---|---|---|---|---|---|
| S1 | −1.161359 | −0.0045 | −0.010639 | 0.0113804 | −0.011834 | 0.0062255 | −0.001743 | 0.0002657 | −2.03E−05 | 5.719E−07 |
| S2 | −17.79572 | 0.0271989 | −0.127359 | 0.1276793 | −0.06641 | 0.0192845 | −0.002627 | −5.46E−05 | 6.1E−05 | −5.29E−06 |
| S3 | −0.394421 | −0.006839 | −0.085757 | 0.1044285 | −0.058743 | 0.0219575 | −0.006309 | 0.0013448 | −0.000175 | 9.237E−06 |
| S4 | 68.8548 | 0.0417806 | −0.059437 | 0.0614116 | −0.04698 | 0.0249452 | −0.008924 | 0.0020787 | −0.000288 | 1.783E−05 |
| S5 | 13.616437 | 0.0001713 | −0.046932 | 0.0558236 | −0.045132 | 0.0267364 | −0.010911 | 0.0029404 | −0.000474 | 3.44E−05 |
| S6 | 3.5288088 | −0.03381 | 0.0006543 | 0.0018061 | 0 | 0 | 0 | 0 | 0 | 0 |
| S7 | 0 | −0.019209 | 0.0025497 | −0.025359 | 0.034472 | −0.028867 | 0.0144453 | −0.003997 | 0.0005266 | −2.08E−05 |
| S8 | 27.786931 | −0.012056 | −0.012508 | −0.012175 | 0.02888 | −0.034211 | 0.0233163 | −0.008771 | 0.0016942 | −0.000132 |
| S9 | 7.1228227 | −0.014765 | 0.0063038 | −0.047259 | 0.0817477 | −0.079874 | 0.0474187 | −0.016529 | 0.003089 | −0.000238 |
| S10 | 31.071146 | −0.032553 | 0.0151876 | −0.026017 | 0.0235163 | −0.012324 | 0.004065 | −0.000839 | 9.91E−05 | −5.06E−06 |
| S11 | −51.95889 | 0.0260382 | 0.0094448 | −0.016928 | 0.0097004 | −0.00354 | 0.0008489 | −0.000129 | 1.119E−05 | −4.13E−07 |
| S12 | −37.5691 | −0.056113 | 0.06705 | −0.034245 | 0.0101176 | −0.001932 | 0.0002385 | −1.82E−05 | 7.707E−07 | −1.39E−08 |
| S13 | −4.553114 | 0.0021547 | −0.003592 | −0.005109 | 0.0027771 | −0.000761 | 0.0001281 | −1.27E−05 | 6.725E−07 | −1.45E−08 |
| S14 | 2.6306482 | 0.0854149 | −0.057605 | 0.0174916 | −0.003523 | 0.0004869 | −4.53E−05 | 2.727E−06 | −9.27E−08 | 1.559E−09 |
| S15 | 12.465682 | −0.062426 | 0.0090269 | 0.0001264 | −0.000159 | 1.94E−05 | −1.2E−06 | 4.228E−08 | −8.28E−10 | 7.082E−12 |
| S16 | −0.893789 | −0.099427 | 0.0290479 | −0.007321 | 0.0013488 | −0.000168 | 1.377E−05 | −7.05E−07 | 2.041E−08 | −2.55E−10 |

Figure 3:
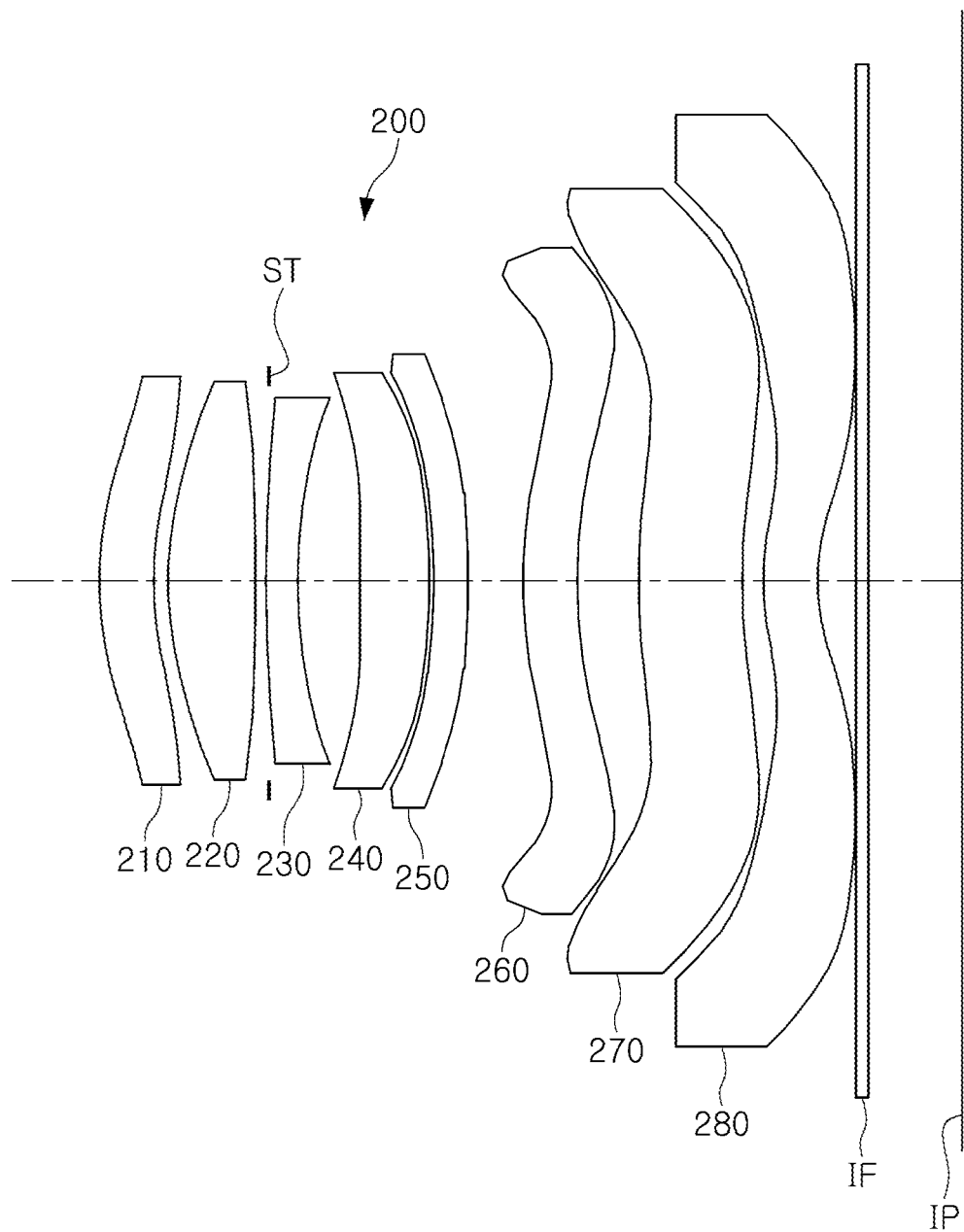
FIG. 3 is a diagram illustrating a second example of an imaging lens system.
Figure 4:
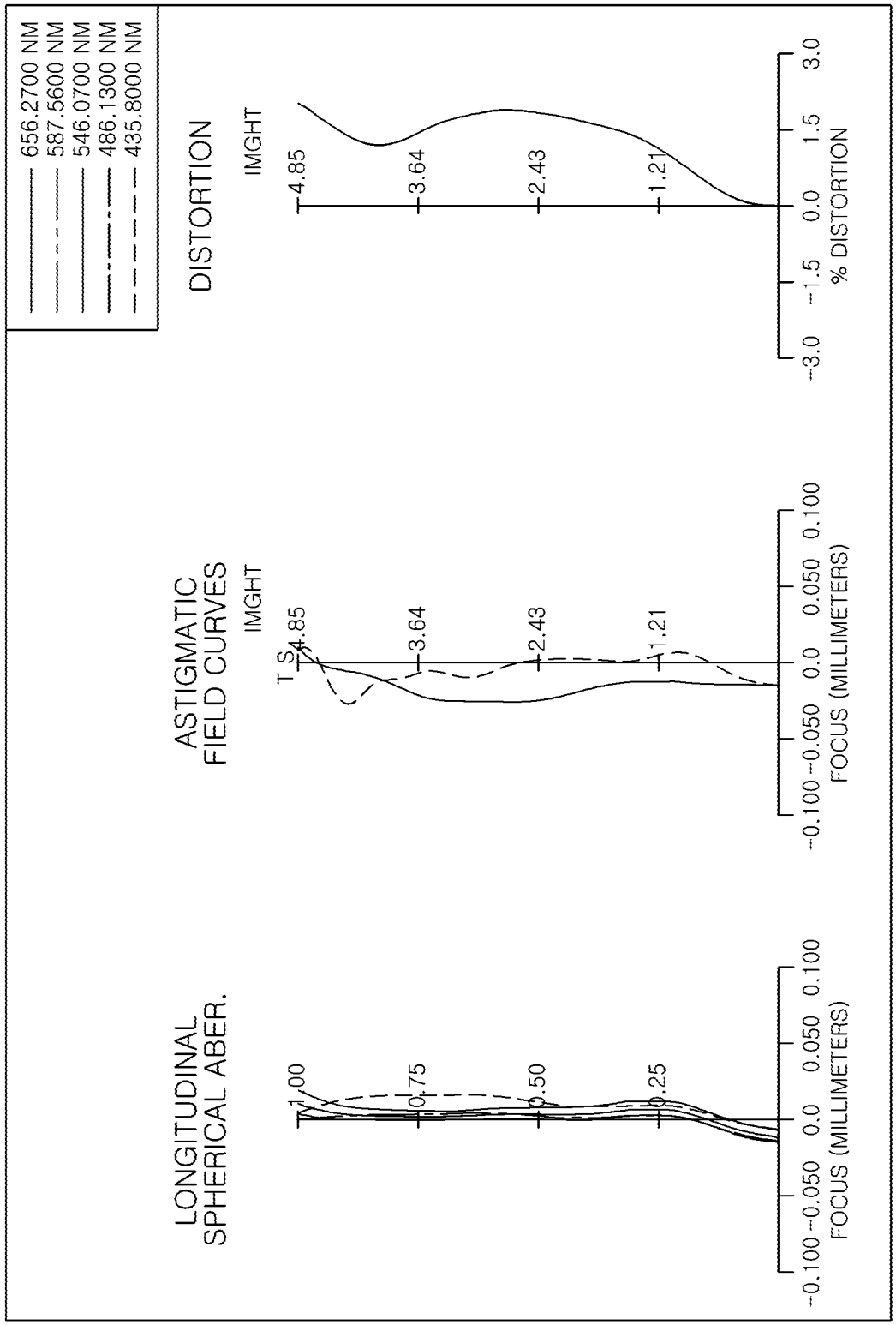
FIG. 4 is aberration curves of the imaging lens system illustrated in FIG. 3.

A second example of the imaging lens system will be described with reference to FIG. 3.

The imaging lens system 200 may include a first lens 210, a second lens 220, a third lens 230, a fourth lens 240, a fifth lens 250, a sixth lens 260, a seventh lens 270 and an eighth lens 280.

The first lens 210 may have positive refractive power, and may have a convex object-side surface and a concave image-side surface. The second lens 220 may have positive refractive power, and may have a convex object-side surface and a convex image-side surface. The third lens 230 may have negative refractive power, and may have a convex object-side surface and a concave image-side surface. The fourth lens 240 may have positive refractive power, and may have a concave object-side surface and a convex image-side surface. The fifth lens 250 may have negative refractive power, and may have a concave object-side surface and a convex image-side surface. The sixth lens 260 may have positive refractive power, and may have a convex object-side surface and a concave image-side surface. An inflection point may be formed on at least one of an object-side surface and an image-side surface of the sixth lens 260. The seventh lens 270 may have negative refractive power, and may have a convex object-side surface and a concave image-side surface. An inflection point may be formed on at least one of an object-side surface and an image-side surface of the seventh lens 270. The eighth lens 280 may have negative refractive power, and a convex object-side surface and a concave image-side surface. An inflection point may be formed on at least one of an object-side surface and an image-side surface of the eighth lens 280.

The imaging lens system 200 may further include a filter IF, an image sensor IMG, and a stop ST. The filter IF may be disposed between the eighth lens 280 and the image sensor IMG. The stop ST may be disposed between the second lens 220 and the third lens 230.

Tables 3 and 4 list lens characteristics and aspherical values of the imaging lens system of the example embodiment.

TABLE 3

| Surface No. | Note | Radius of Curvature | Thickness/ Distance | Refractive Index | Abbe Number | Effective Radius |
|---|---|---|---|---|---|---|
| S1 | First | 2.863 | 0.472 | 1.546 | 56.093 | 1.738 |
| S2 | Lens | 2.903 | 0.117 | | | 1.716 |
| S3 | Second | 2.897 | 0.746 | 1.546 | 56.093 | 1.697 |
| S4 | Lens | −136.349 | 0.095 | | | 1.644 |
| S5 | (Stop) | 9.232 | 0.270 | 1.678 | 19.236 | 1.538 |
| S6 | Third Lens | 4.147 | 0.543 | | | 1.557 |
| S7 | Fourth | −44.273 | 0.578 | 1.546 | 56.093 | 1.595 |
| S8 | Lens | −6.791 | 0.040 | | | 1.767 |
| S9 | Fifth | −6.753 | 0.305 | 1.678 | 19.236 | 1.802 |
| S10 | Lens | −9.137 | 0.465 | | | 1.932 |
| S11 | Sixth | 5.322 | 0.470 | 1.546 | 56.093 | 2.442 |
| S12 | Lens | 6.039 | 0.516 | | | 2.833 |
| S13 | Seventh | 5.419 | 0.889 | 1.546 | 56.093 | 2.875 |
| S14 | Lens | 4.474 | 0.176 | | | 3.340 |
| S15 | Eighth | 2.024 | 0.472 | 1.546 | 56.093 | 3.399 |
| S16 | Lens | 1.511 | 0.299 | | | 3.963 |
| S17 | Filter | infinity | 0.110 | 1.518 | 64.197 | 4.359 |
| S18 | | infinity | 0.810 | | | 4.396 |
| S19 | Imaging Plane | infinity | 0.015 | | | 4.852 |

TABLE 4

| Surface No. | K | A | B | C | D | E | F | G | H | J |
|---|---|---|---|---|---|---|---|---|---|---|
| S1 | −0.911811 | −0.007664 | −0.000469 | −0.008703 | 0.01266 | −0.010188 | 0.0047184 | −0.001246 | 0.0001748 | −1.01E−05 |
| S2 | −11.13341 | 0.0340897 | −0.064952 | 0.0497543 | −0.03353 | 0.018615 | −0.00677 | 0.001452 | −0.000168 | 8.067E−06 |
| S3 | −1.123851 | −0.001169 | −0.026759 | 0.0193194 | −0.013779 | 0.0092721 | −0.003237 | 0.0004189 | 2.215E−05 | −7.46E−06 |
| S4 | 30.283075 | 0.0130257 | −0.052002 | 0.0670289 | −0.061993 | 0.0425311 | −0.020085 | 0.0060277 | −0.001028 | 7.532E−05 |
| S5 | 11.825103 | −0.007691 | −0.049795 | 0.0788385 | −0.070452 | 0.045429 | −0.021008 | 0.0063682 | −0.0011 | 8.086E−05 |
| S6 | 1.9017643 | −0.013962 | −0.024848 | 0.0511311 | −0.053131 | 0.0374405 | −0.01793 | 0.0054545 | −0.000925 | 6.541E−05 |
| S7 | −41.25 | −0.008838 | −0.003904 | −0.018169 | 0.027863 | −0.024883 | 0.0141866 | −0.004942 | 0.0009569 | −7.8E−05 |
| S8 | 9.1661668 | 0.042014 | −0.074103 | 0.0614437 | −0.042747 | 0.0205091 | −0.005444 | 0.0006358 | −1.45E−05 | 0 |
| S9 | 9.685266 | 0.0323547 | −0.083412 | 0.0886206 | −0.062547 | 0.0293986 | −0.008319 | 0.0012292 | −6.95E−05 | 0 |

TABLE 4-continued

| Surface No. | K | A | B | C | D | E | F | G | H | J |
|---|---|---|---|---|---|---|---|---|---|---|
| S10 | −2.087742 | −0.001375 | −0.042277 | 0.0418318 | −0.022311 | 0.0071729 | −0.001325 | 0.0001022 | 5.121E−06 | −9.69E−07 |
| S11 | −38.01108 | 0.0747381 | −0.062288 | 0.0326386 | −0.012561 | 0.0032923 | −0.000571 | 6.161E−05 | −3.68E−06 | 9.266E−08 |
| S12 | −10.62234 | 0.0490935 | −0.033728 | 0.014294 | −0.004536 | 0.0009896 | −0.000143 | 1.281E−05 | −6.43E−07 | 1.364E−08 |
| S13 | −5.925617 | 0.0039065 | −0.017974 | 0.0088721 | −0.003371 | 0.0008317 | −0.000123 | 1.068E−05 | −4.98E−07 | 9.659E−09 |
| S14 | 0.60011 | −0.03136 | 0.0032533 | −0.000502 | 0.0002773 | −0.000111 | 2.059E−05 | 1.95E−06 | 9.246E−08 | −1.74E−09 |
| S15 | −0.945574 | −0.15437 | 0.0236798 | 0.0072144 | −0.004001 | 0.0008322 | −9.63E−05 | 6.477E−06 | −2.37E−07 | 3.637E−09 |
| S16 | −1.372566 | −0.142738 | 0.0449077 | −0.009058 | 0.0012208 | −0.000109 | 6.27E−06 | −2.21E−07 | 4.365E−09 | −3.79E−11 |

Figure 5:
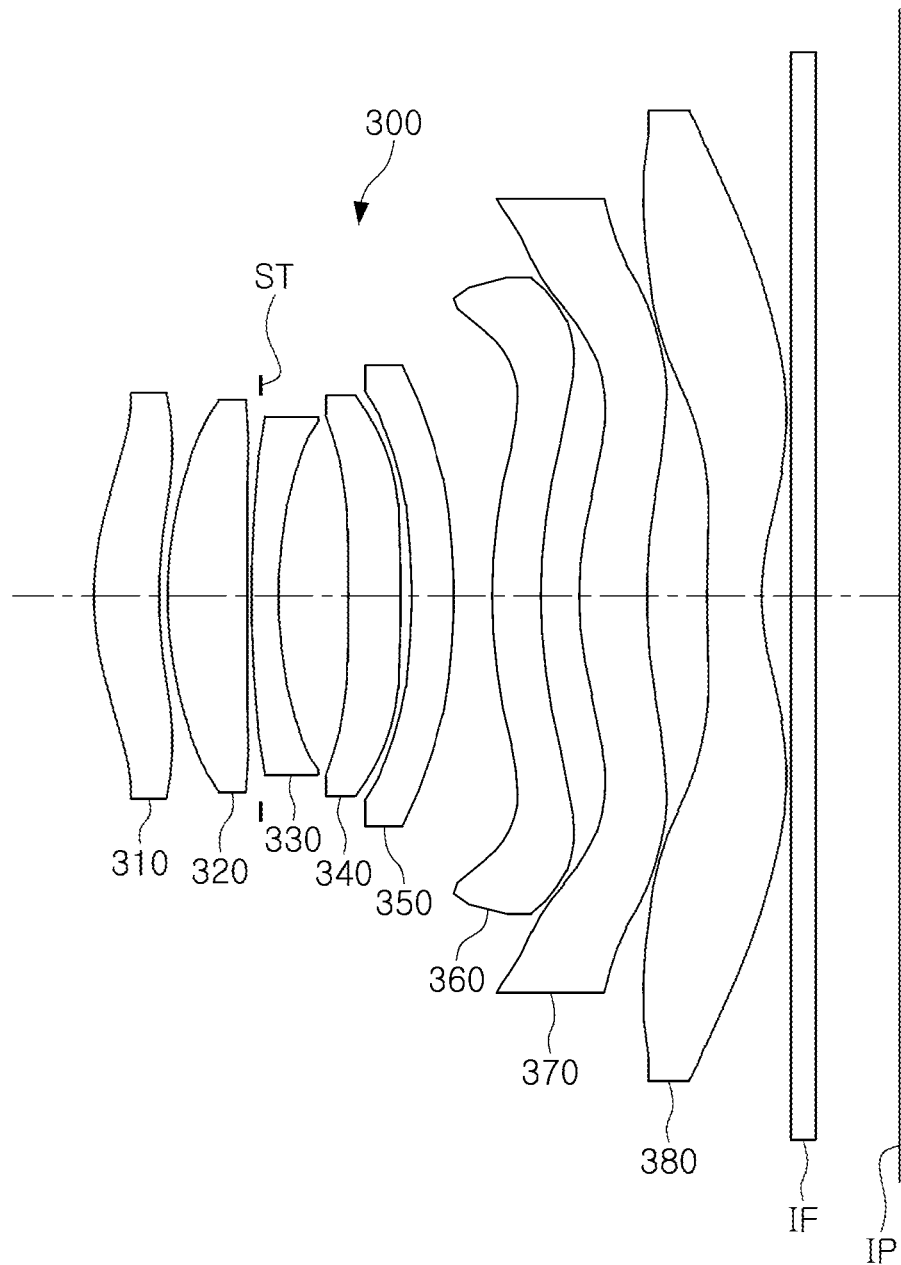
FIG. 5 is a diagram illustrating a third example of an imaging lens system.
Figure 6:
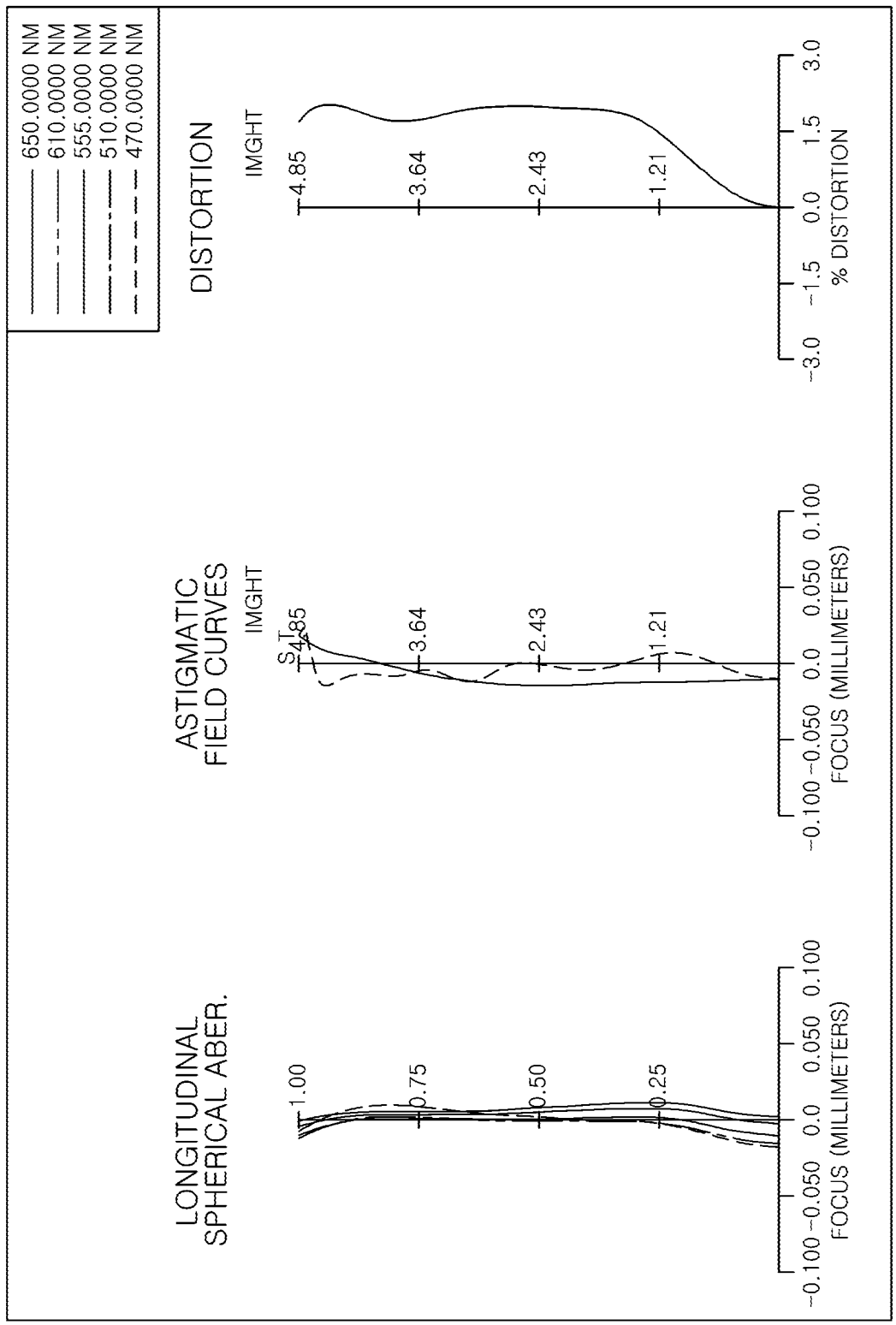
FIG. 6 is aberration curves of the imaging lens system illustrated in FIG. 5.

A third example of the imaging lens system will be described with reference to FIG. 5.

The imaging lens system 300 may include a first lens 310, a second lens 320, a third lens 330, a fourth lens 340, a fifth lens 350, a sixth lens 360, a seventh lens 370 and an eighth lens 380.

The first lens 310 may have positive refractive power, and may have a convex object-side surface and a concave image-side surface. The second lens 320 may have positive refractive power, and may have a convex object-side surface and a concave image-side surface. The third lens 330 may have negative refractive power, and may have a convex object-side surface and a concave image-side surface. The fourth lens 340 may have positive refractive power, and may have a convex object-side surface and a convex image-side surface. The fifth lens 350 may have negative refractive power, and may have a concave object-side surface and a convex image-side surface. The sixth lens 360 may have positive refractive power, and may have a convex object-side surface and a concave image-side surface. An inflection point may be formed on at least one of an object-side surface and an image-side surface of the sixth lens 360. The seventh lens 370 may have positive refractive power, and may have a convex object-side surface and a concave image-side surface. An inflection point may be formed on at least one of an object-side surface and an image-side surface of the seventh lens 370. The eighth lens 380 may have negative refractive power, and a convex object-side surface and a concave image-side surface. An inflection point may be formed on at least one of an object-side surface and an image-side surface of the eighth lens 380.

The imaging lens system 300 may further include a filter IF, an image sensor IMG, and a stop ST. The filter IF may be disposed between the eighth lens 380 and the image sensor IMG. The stop ST may be disposed between the second lens 320 and the third lens 330.

Tables 5 and 6 list lens characteristics and aspherical values of the imaging lens system of the example embodiment.

TABLE 5

| Surface No. | Note | Radius of Curvature | Thickness/ Distance | Refractive Index | Abbe Number | Effective Radius |
|---|---|---|---|---|---|---|
| S1 | First | 2.632 | 0.536 | 1.546 | 56.093 | 1.738 |
| S2 | Lens | 3.045 | 0.070 | | | 1.716 |
| S3 | Second | 2.858 | 0.666 | 1.546 | 56.093 | 1.697 |
| S4 | Lens | 62.406 | 0.030 | | | 1.644 |
| S5 | (Stop) | 6.485 | 0.230 | 1.678 | 19.236 | 1.538 |
| S6 | Third Lens | 3.539 | 0.574 | | | 1.557 |
| S7 | Fourth | 101.434 | 0.437 | 1.546 | 56.093 | 1.595 |
| S8 | Lens | −21.866 | 0.093 | | | 1.767 |
| S9 | Fifth | −6.353 | 0.350 | 1.678 | 19.236 | 1.802 |
| S10 | Lens | −8.100 | 0.320 | | | 1.932 |
| S11 | Sixth | 4.018 | 0.410 | 1.546 | 56.093 | 2.442 |
| S12 | Lens | 4.261 | 0.321 | | | 2.833 |
| S13 | Seventh | 3.256 | 0.559 | 1.546 | 56.093 | 2.875 |
| S14 | Lens | 8.232 | 0.494 | | | 3.340 |
| S15 | Eighth | 6.054 | 0.460 | 1.546 | 56.093 | 3.399 |
| S16 | Lens | 1.958 | 0.241 | | | 3.963 |
| S17 | Filter | infinity | 0.210 | 1.518 | 64.197 | 4.359 |
| S18 | | infinity | 0.690 | | | 4.396 |
| S19 | Imaging Plane | infinity | 0.010 | | | 4.852 |

TABLE 6

| Surface No. | K | A | B | C | D | E | F | G | H | J |
|---|---|---|---|---|---|---|---|---|---|---|
| S1 | −1.701575 | −0.005407 | −0.001701 | −0.009793 | 0.0132688 | −0.012767 | 0.0071774 | −0.002249 | 0.0003705 | −2.53E−05 |
| S2 | −19.78434 | 0.0321791 | −0.096192 | −0.0546962 | −0.003841 | −0.009651 | 0.0049024 | −0.001048 | 9.762E−05 | −2.35E−06 |
| S3 | −0.542074 | −0.023522 | −0.01076 | −0.026139 | 0.0609223 | −0.043423 | 0.0161779 | −0.003545 | 0.0004694 | −3.37E−05 |
| S4 | 30.283046 | −0.040872 | 0.1127756 | −0.198354 | 0.22822 | −0.170543 | 0.0816647 | −0.02398 | 0.0038939 | −0.000267 |
| S5 | 8.9398341 | −0.084161 | 0.1330782 | −0.201106 | 0.2274929 | −0.176657 | 0.0900727 | −0.028247 | 0.0048689 | −0.000349 |
| S6 | 2.7331038 | −0.047264 | 0.0366837 | −0.019967 | −0.001908 | 0.018051 | −0.018422 | 0.0099999 | −0.002874 | 0.0003414 |
| S7 | −41.25002 | −0.019107 | −0.021358 | 0.0337351 | −0.050668 | 0.0461944 | −0.027391 | 0.0101252 | −0.001996 | 0.0001507 |
| S8 | 58.298408 | 0.0229724 | −0.11284 | 0.1102449 | −0.073456 | 0.0378089 | −0.017245 | 0.0064318 | −0.001478 | 0.0001429 |
| S9 | 8.1447501 | 0.03124 | −0.109445 | 0.074501 | 0.0119562 | −0.04647 | 0.0306045 | −0.010021 | 0.0016863 | −0.000117 |
| S10 | 3.8558396 | −0.003326 | −0.058175 | 0.0504283 | −0.01583 | −0.001322 | 0.0027792 | −0.00099 | 0.0001651 | −1.11E−05 |
| S11 | −38.01091 | 0.0642956 | −0.055388 | 0.0262721 | −0.007274 | 0.0004227 | 0.0003424 | −0.000107 | 1.287E−05 | −5.68E−07 |
| S12 | −51.63727 | 0.0546439 | −0.044974 | 0.025558 | −0.010107 | 0.0025606 | −0.000409 | 3.939E−05 | −2.08E−06 | 4.566E−08 |
| S13 | −11.06281 | 0.0493051 | −0.053751 | 0.0214147 | −0.004899 | 0.000554 | −1.07E−05 | −3.7E−06 | 3.345E−07 | −8.84E−09 |
| S14 | 4.5270834 | 0.0842394 | −0.079555 | 0.0333432 | −0.008858 | 0.0015389 | −0.000173 | 1.212E−05 | −4.8E−07 | 8.204E−09 |
| S15 | 0.484055 | −0.067794 | −0.0138 | 0.0128084 | −0.003171 | 0.0004162 | −3.25E−05 | 1.522E−06 | −3.95E−08 | 4.391E−10 |
| S16 | −1.148523 | −0.110511 | 0.0258627 | −0.004498 | 0.0006443 | −7.4E−05 | 6.157E−06 | −3.33E−07 | 1.03E−08 | −1.37E−10 |

Figure 7:
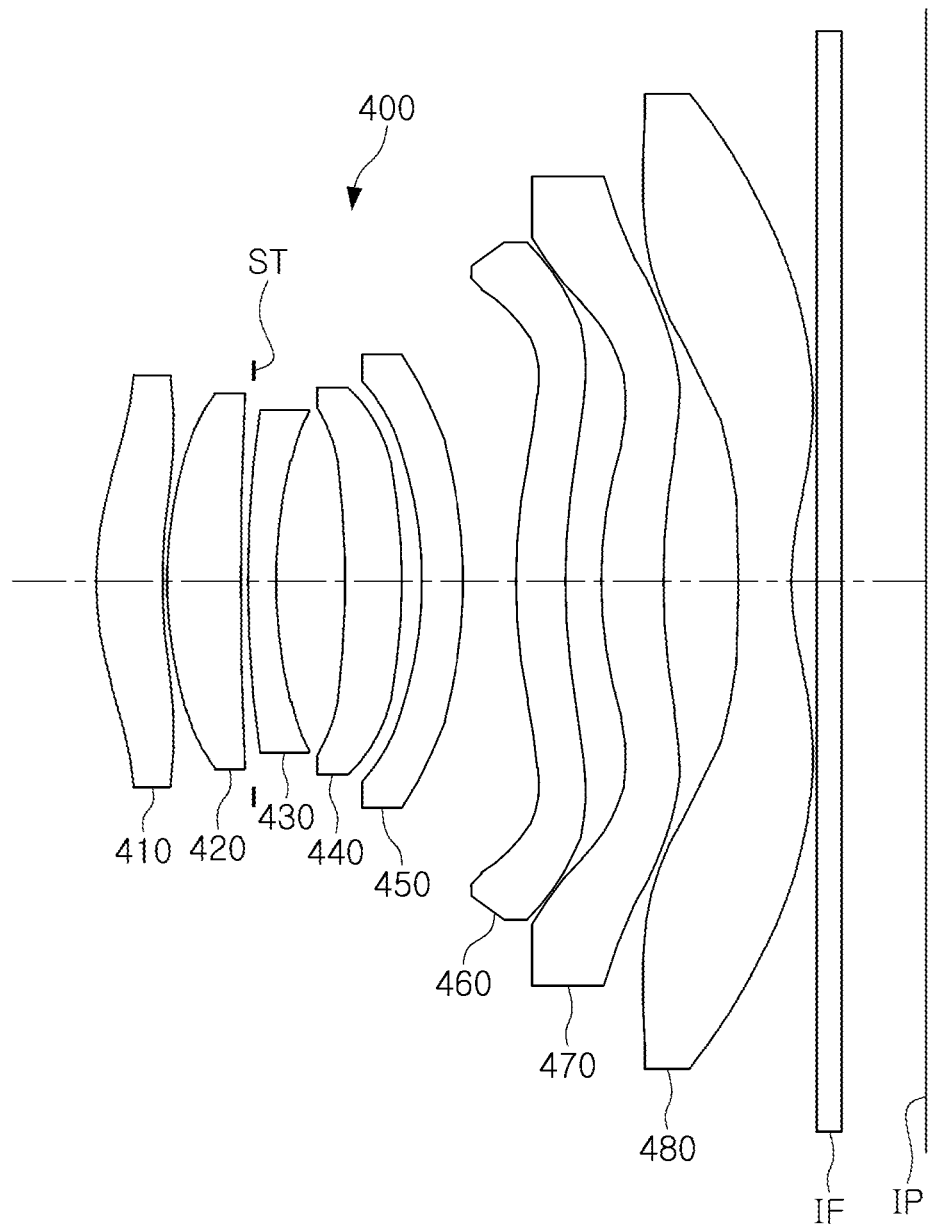
FIG. 7 is a diagram illustrating a fourth example of an imaging lens system.
Figure 8:
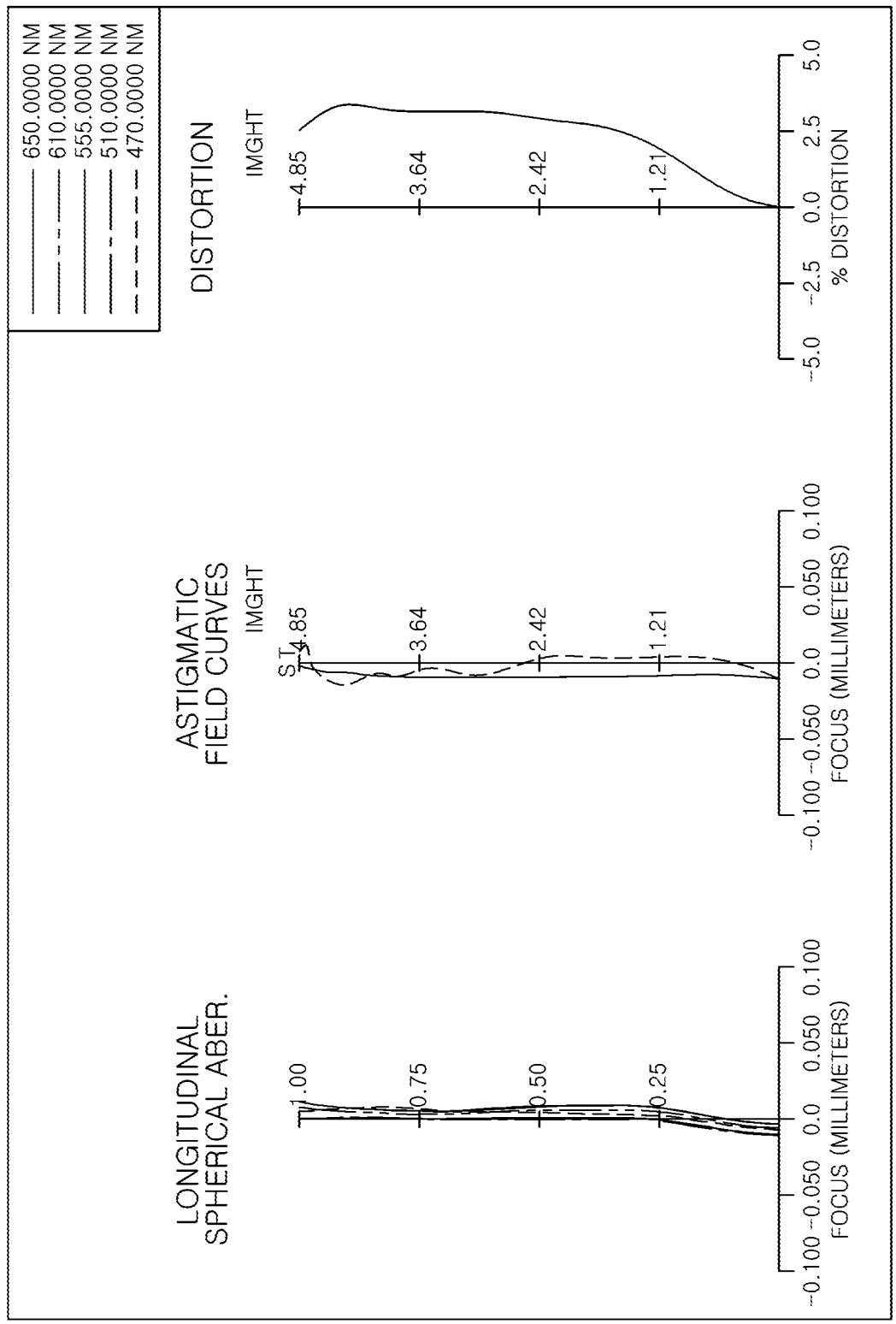
FIG. 8 is aberration curves of the imaging lens system illustrated in FIG. 7.

A fourth example of the imaging lens system will be described with reference to FIG. 7.

The imaging lens system 400 may include a first lens 410, a second lens 420, a third lens 430, a fourth lens 440, a fifth lens 450, a sixth lens 460, a seventh lens 470 and an eighth lens 480.

The first lens 410 may have positive refractive power, and may have a convex object-side surface and a concave image-side surface. The second lens 420 may have positive refractive power, and may have a convex object-side surface and a concave image-side surface. The third lens 430 may have negative refractive power, and may have a convex object-side surface and a concave image-side surface. The fourth lens 440 may have positive refractive power, and may have a concave object-side surface and a convex image-side surface. The fifth lens 450 may have negative refractive power, and may have a concave object-side surface and a convex image-side surface. The sixth lens 460 may have positive refractive power, and may have a convex object-side surface and a concave image-side surface. An inflection point may be formed on at least one of an object-side surface and an image-side surface of the sixth lens 460. The seventh lens 470 may have positive refractive power, and may have a convex object-side surface and a concave image-side surface. An inflection point may be formed on at least one of an object-side surface and an image-side surface of the seventh lens 470. The eighth lens 480 may have negative refractive power, and a convex object-side surface and a concave image-side surface. An inflection point may be formed on at least one of an object-side surface and an image-side surface of the eighth lens 480.

The imaging lens system 400 may further include a filter IF, an image sensor IMG, and a stop ST. The filter IF may be disposed between the eighth lens 480 and the image sensor IMG. The stop ST may be disposed between the second lens 420 and the third lens 430.

Tables 7 and 8 list lens characteristics and aspherical values of the imaging lens system of the example embodiment.

TABLE 7

| Surface No. | Note | Radius of Curvature | Thickness/ Distance | Refractive Index | Abbe Number | Effective Radius |
|---|---|---|---|---|---|---|
| S1 | First | 2.805 | 0.550 | 1.546 | 56.093 | 1.700 |
| S2 | Lens | 3.353 | 0.037 | | | 1.649 |
| S3 | Second | 2.950 | 0.615 | 1.546 | 56.093 | 1.550 |
| S4 | Lens | 1993.359 | 0.058 | | | 1.472 |
| S5 | (Stop) | 7.628 | 0.230 | 1.678 | 19.236 | 1.416 |
| S6 | Third Lens | 3.611 | 0.571 | | | 1.400 |
| S7 | Fourth | −45.702 | 0.469 | 1.546 | 56.093 | 1.440 |
| S8 | Lens | −10.521 | 0.171 | | | 1.598 |
| S9 | Fifth | −5.176 | 0.359 | 1.678 | 19.236 | 1.654 |
| S10 | Lens | −6.808 | 0.429 | | | 1.873 |
| S11 | Sixth | 4.181 | 0.410 | 1.546 | 56.093 | 2.424 |
| S12 | Lens | 4.594 | 0.301 | | | 2.793 |
| S13 | Seventh | 3.060 | 0.514 | 1.546 | 56.093 | 2.830 |
| S14 | Lens | 8.010 | 0.611 | | | 3.337 |
| S15 | Eighth | 26.705 | 0.460 | 1.546 | 56.093 | 3.807 |
| S16 | Lens | 2.357 | 0.205 | | | 4.026 |
| S17 | Filter | infinity | 0.210 | 1.518 | 64.197 | 4.486 |
| S18 | | infinity | 0.690 | | | 4.544 |
| S19 | Imaging Plane | infinity | 0.010 | | | 4.851 |

TABLE 8

| Surface No. | K | A | B | C | D | E | F | G | H | J |
|---|---|---|---|---|---|---|---|---|---|---|
| S1 | −1.408912 | −0.007273 | −0.002594 | −0.003542 | 0.0033818 | −0.003504 | 0.0023259 | −0.000829 | 0.00015 | −1.1E−05 |
| S2 | −19.9582 | −0.009254 | −0.071565 | 0.0922079 | −0.057488 | 0.0196434 | −0.003119 | −0.000107 | 0.0001126 | −1.17E−05 |
| S3 | −0.144527 | −0.045999 | −0.013264 | 0.0365527 | −0.003455 | −0.017946 | 0.0145078 | −0.005478 | 0.0010797 | −9.08E−05 |
| S4 | 99 | 0.0247028 | −0.0305 | 0.0205204 | 0.0003062 | −0.012189 | 0.0104308 | −0.004205 | 0.0008284 | −6.38E−05 |
| S5 | 15.665257 | −0.020323 | −0.013659 | 0.0079119 | 0.0178468 | −0.029738 | 0.0219986 | −0.008856 | 0.0018464 | −0.000155 |
| S6 | 3.6850001 | −0.036649 | 0.0059625 | 0.001559 | 0 | 0 | 0 | 0 | 0 | 0 |
| S7 | −96.34693 | −0.025246 | −0.001221 | −0.030845 | 0.0494988 | −0.049972 | 0.0305359 | −0.010614 | 0.0018981 | −0.000129 |
| S8 | 34.75155 | −0.01968 | −0.000702 | −0.039947 | 0.0661277 | −0.068862 | 0.0455339 | −0.017611 | 0.0036016 | −0.0003 |
| S9 | 7.6290729 | −0.027504 | 0.0156113 | −0.044255 | 0.0679394 | −0.064842 | 0.0408933 | −0.015709 | 0.0032484 | −0.000275 |
| S10 | 6.3695709 | −0.042515 | 0.0168972 | −0.023621 | 0.0263251 | −0.01685 | 0.0069388 | −0.001866 | 0.0002939 | −2E−05 |
| S11 | −39.58882 | 0.0332075 | −0.016432 | −0.000666 | 0.0033537 | −0.001777 | 0.0005034 | −8.48E−05 | 7.842E−06 | −2.99E−07 |
| S12 | −38.90965 | 0.0031958 | 0.0087269 | 0.009573 | 0.0039155 | −0.000931 | 0.000134 | −1.14E−05 | 5.202E−07 | −9.92E−09 |
| S13 | −5.934607 | 0.0141147 | −0.03114 | 0.0131367 | 0.003344 | 0.0003951 | 2.171E−06 | −5.08E−06 | 4.439E−07 | −1.22E−08 |
| S14 | 3.6920397 | 0.0664134 | −0.067901 | 0.0297177 | −0.008564 | 0.0016245 | −0.000196 | 1.445E−05 | −5.9E−07 | 1.025E−08 |
| S15 | 14.522746 | −0.060645 | −0.001095 | 0.0047809 | −0.001127 | 0.0001348 | −9.69E−06 | 4.258E−07 | −1.06E−08 | 1.146E−10 |
| S16 | −1.019966 | −0.097768 | 0.026661 | −0.006299 | 0.001205 | −0.000165 | 1.488E−05 | −8.21E−07 | 2.506E−08 | −3.23E−10 |

Figure 9:
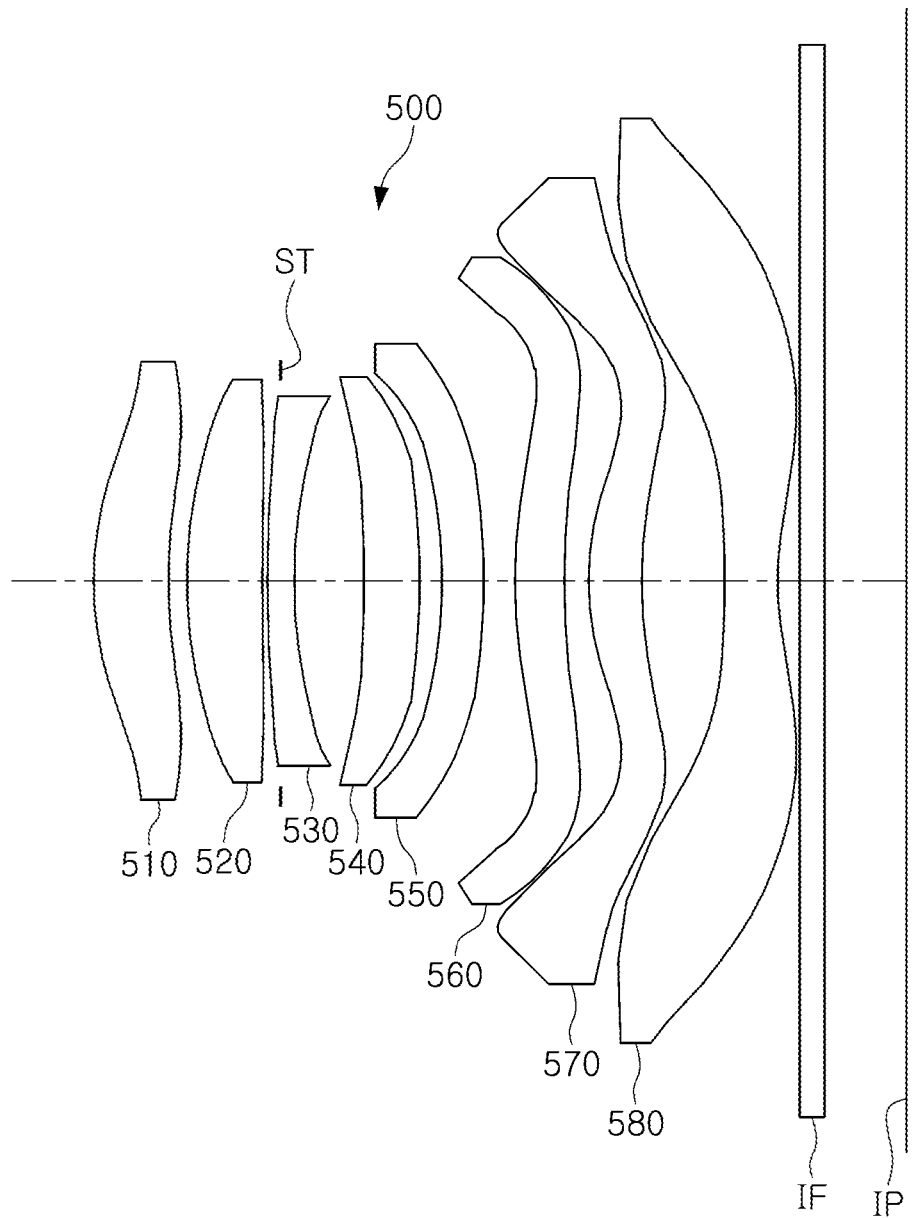
FIG. 9 is a diagram illustrating a fifth example of an imaging lens system.
Figure 10:
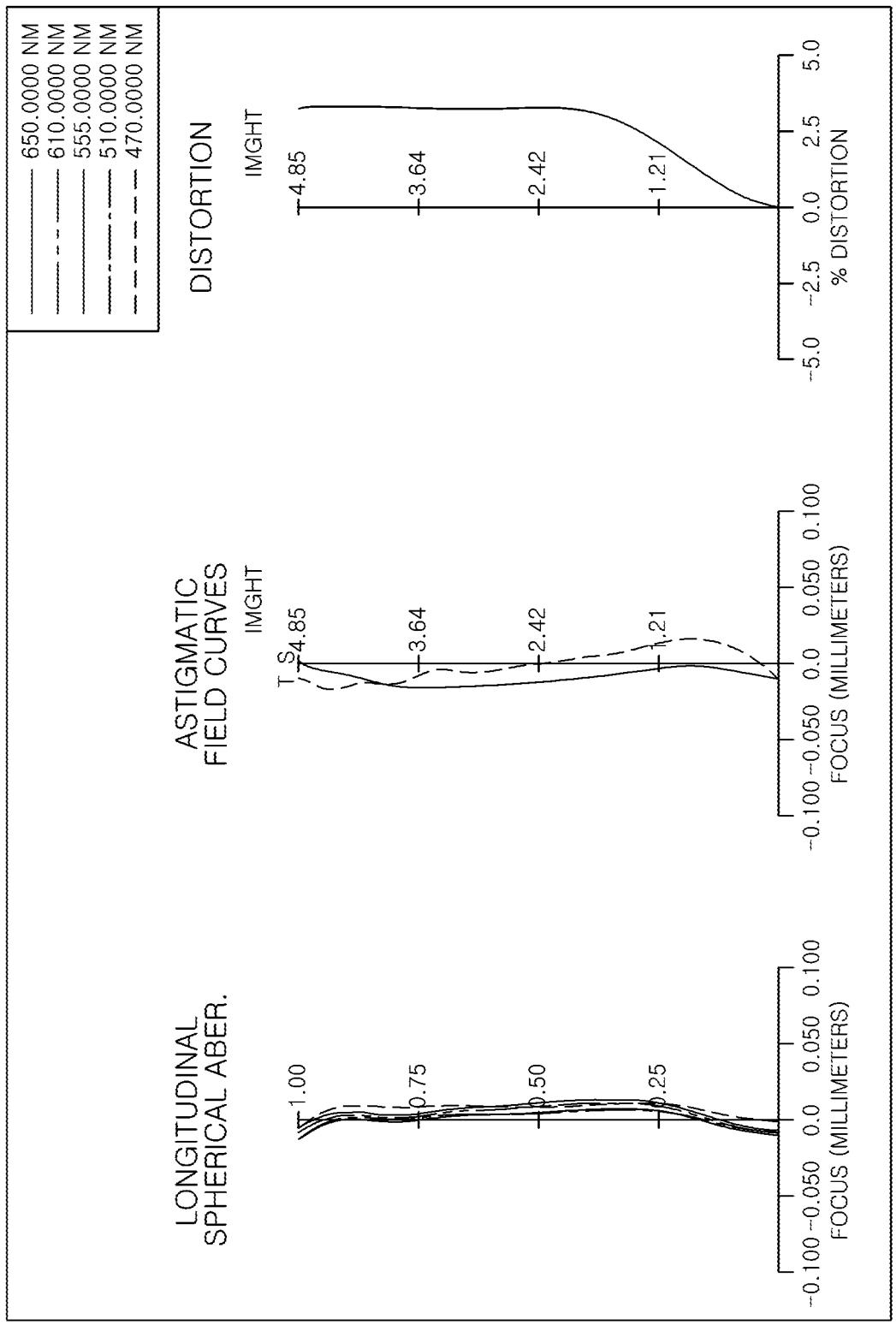
FIG. 10 is aberration curves of the imaging lens system illustrated in FIG. 9.

A fifth example of the imaging lens system will be described with reference to FIG. 9.

The imaging lens system 500 may include a first lens 510, a second lens 520, a third lens 530, a fourth lens 540, a fifth lens 550, a sixth lens 560, a seventh lens 570 and an eighth lens 580.

The first lens 510 may have positive refractive power, and may have a convex object-side surface and a concave image-side surface. The second lens 520 may have positive refractive power, and may have a convex object-side surface and a concave image-side surface. The third lens 530 may have negative refractive power, and may have a convex object-side surface and a concave image-side surface. The fourth lens 540 may have positive refractive power, and may have a convex object-side surface and a convex image-side surface. The fifth lens 550 may have negative refractive power, and may have a concave object-side surface and a convex image-side surface. The sixth lens 560 may have negative refractive power, and may have a convex object-side surface and a concave image-side surface. An inflection point may be formed on at least one of an object-side surface and an image-side surface of the sixth lens 560. The seventh lens 570 may have positive refractive power, and may have a convex object-side surface and a concave image-side surface. An inflection point may be formed on at least one of an object-side surface and an image-side surface of the seventh lens 570. The eighth lens 580 may have negative refractive power, and a concave object-side surface and a concave image-side surface. An inflection point may be formed on at least one of an object-side surface and an image-side surface of the eighth lens 580.

The imaging lens system 500 may further include a filter IF, an image sensor IMG, and a stop ST. The filter IF may be disposed between the eighth lens 580 and the image sensor IMG. The stop ST may be disposed between the second lens 520 and the third lens 530.

Tables 9 and 10 list lens characteristics and aspherical values of the imaging lens system of the example embodiment.

TABLE 9

| Surface No. | Note | Radius of Curvature | Thickness/ Distance | Refractive Index | Abbe Number | Effective Radius |
|---|---|---|---|---|---|---|
| S1 | First | 2.739 | 0.624 | 1.546 | 56.093 | 1.700 |
| S2 | Lens | 3.989 | 0.163 | | | 1.649 |
| S3 | Second | 3.598 | 0.647 | 1.546 | 56.093 | 1.550 |
| S4 | Lens | −230.218 | 0.030 | | | 1.472 |
| S5 | (Stop) | 8.696 | 0.230 | 1.678 | 19.236 | 1.416 |
| S6 | Third Lens | 3.893 | 0.572 | | | 1.400 |
| S7 | Fourth | 85.637 | 0.491 | 1.546 | 56.093 | 1.440 |
| S8 | Lens | −12.401 | 0.193 | | | 1.598 |
| S9 | Fifth | −6.547 | 0.350 | 1.678 | 19.236 | 1.654 |
| S10 | Lens | −16.613 | 0.278 | | | 1.873 |
| S11 | Sixth | 4.482 | 0.420 | 1.645 | 23.528 | 2.424 |
| S12 | Lens | 3.872 | 0.216 | | | 2.793 |
| S13 | Seventh | 2.216 | 0.439 | 1.546 | 56.093 | 2.830 |
| S14 | Lens | 7.911 | 0.690 | | | 3.337 |
| S15 | Eighth | −262.747 | 0.460 | 1.546 | 56.093 | 3.807 |
| S16 | Lens | 2.532 | 0.186 | | | 4.026 |
| S17 | Filter | infinity | 0.210 | 1.518 | 64.197 | 4.486 |
| S18 | | infinity | 0.690 | | | 4.544 |
| S19 | Imaging Plane | infinity | 0.010 | | | 4.851 |

TABLE 10

| Surface No. | K | A | B | C | D | E | F | G | H | J |
|---|---|---|---|---|---|---|---|---|---|---|
| S1 | −0.913151 | −0.005349 | 2.623E−05 | −0.005867 | 0.0059682 | −0.004147 | 0.001643 | −0.000356 | 3.954E−05 | −1.78E−06 |
| S2 | −14.79752 | −3.7E−05 | −0.020135 | 0.0079456 | −0.00458 | 0.0042432 | −0.002253 | 0.0006417 | −9.58E−05 | 5.957E−06 |
| S3 | −0.028154 | −0.012861 | −0.004673 | 5.933E−05 | 0.0006026 | 0.0015932 | −0.000576 | −0.000167 | 0.0001054 | −1.39E−05 |
| S4 | 99 | 0.0424166 | −0.076853 | 0.0810694 | −0.069606 | 0.0473591 | −0.022223 | 0.0065253 | −0.001075 | 7.556E−05 |
| S5 | 15.213212 | 0.0093738 | −0.058927 | 0.0637281 | −0.052184 | 0.0353955 | −0.017214 | 0.005361 | −0.000948 | 7.224E−05 |
| S6 | 4.2693481 | −0.027362 | −0.00168 | 0 | 0.001302 | 0 | 0 | 0 | 0 | 0 |
| S7 | 99 | −0.013184 | −0.016199 | 0.078417 | −0.053871 | 0.0600167 | −0.041537 | 0.0173905 | −0.003976 | 0.0003804 |
| S8 | 35.509141 | −0.007544 | −0.029556 | 0.0339727 | −0.03462 | 0.023509 | −0.012045 | 0.00462 | −0.001068 | 0.0001041 |
| S9 | 11.242092 | −0.016356 | −0.014025 | −0.013168 | 0.0508926 | −0.055701 | 0.0314095 | −0.009676 | 0.0015263 | −9.52E−05 |
| S10 | 35.879843 | −0.032734 | 0.0023961 | −0.025022 | 0.0374842 | −0.026826 | 0.0112023 | −0.00278 | 0.0003774 | −2.14E−05 |
| S11 | −71.83366 | 0.0334437 | 0.006769 | 0.007775 | 0.0060767 | −0.002669 | 0.0007681 | −0.00014 | 1.426E−05 | −6.02E−07 |
| S12 | −44.8505 | −0.049344 | 0.0625947 | −0.03672 | 0.0118576 | −0.002375 | 0.0002982 | −2.27E−05 | 9.542E−07 | −1.7E−08 |
| S13 | −3.777068 | −0.014003 | −0.000294 | −0.010316 | 0.0072789 | −0.002737 | 0.0005961 | −7.33E−05 | 4.711E−06 | −1.23E−07 |
| S14 | 3.4700475 | 0.1032461 | −0.089533 | 0.0362183 | −0.009846 | 0.0017776 | −0.000204 | 1.425E−05 | −5.5E−07 | 9.04E−09 |
| S15 | 99 | −0.064637 | 0.0102359 | −0.000521 | 5.822E−05 | 1.78E−05 | 2.283E−06 | −1.41E−07 | 4.246E−09 | −5.08E−11 |
| S16 | −0.980374 | −0.098376 | 0.0315186 | −0.009021 | 0.0019191 | −0.000277 | 2.597E−05 | −1.51E−06 | 4.91E−08 | −6.83E−10 |

Tables 11 and 12 list optical properties values and values of conditional expressions of the imaging lens system of the first to fifth example embodiments. In Table 11, "SL" is a distance from a stop to an imaging plane, and "IMGHT" is a height of the imaging plane.

TABLE 11

| Note | First Example | Second Example | Third Example | Fourth Example | Fifth Example |
|---|---|---|---|---|---|
| f number | 1.483 | 1.666 | 1.629 | 1.763 | 1.566 |
| TTL | 7.127 | 7.387 | 6.700 | 6.900 | 6.900 |
| SL | 5.633 | 5.957 | 5.398 | 5.640 | 5.436 |
| IMGHT | 4.850 | 4.850 | 4.850 | 4.850 | 4.850 |
| 2IMGHT | 9.700 | 9.700 | 9.700 | 9.700 | 9.700 |
| FOV | 82.744 | 78.662 | 82.529 | 80.291 | 81.026 |
| f | 5.426 | 5.789 | 5.427 | 5.658 | 5.557 |
| f1 | 27.895 | 73.563 | 24.360 | 23.233 | 13.606 |
| f2 | 5.722 | 5.201 | 5.464 | 5.411 | 6.496 |
| f3 | −12.264 | −11.321 | −11.874 | −10.361 | −10.608 |
| f4 | 17.412 | 14.599 | 32.991 | 24.919 | 19.877 |
| f5 | −12.804 | −40.173 | −47.279 | −34.988 | −16.174 |
| f6 | −121.424 | 66.621 | 80.849 | 63.084 | −60.448 |
| f7 | 5.222 | −70.314 | 9.489 | 8.747 | 5.490 |
| f8 | −4.889 | −16.154 | −5.522 | −4.767 | −4.591 |

TABLE 12

| Conditional Expression | First Example | Second Example | Third Example | Fourth Example | Fifth Example |
|---|---|---|---|---|---|
| TTL/2IMGHT | 0.735 | 0.762 | 0.691 | 0.711 | 0.711 |
| \|f1/f8\| | 5.706 | 4.554 | 4.411 | 4.873 | 2.964 |

According to the aforementioned example embodiments, performance of a small-sized camera may improve.

While the example embodiments have been shown and described above, it will be apparent to those skilled in the art that modifications and variations could be made without departing from the scope of the present invention as defined by the appended claims.

What is claimed is:

1. An imaging lens system, comprising:
a first lens having a refractive power;
a second lens having a refractive power;
a third lens having a concave image-side surface;
a fourth lens having a concave object-side surface in a paraxial region thereof and a convex image-side surface in a paraxial region thereof;
a fifth lens having a refractive power;
a sixth lens having a refractive power;
a seventh lens having a concave image-side surface; and an eighth lens having a refractive power and a convex object-side surface in a paraxial region thereof, wherein the first to eighth lenses are sequentially disposed from an object side toward an imaging plane, wherein the imaging lens system includes a total number of eight lenses with refractive power, wherein f number≤1.8, wherein TTL/2IMGHT≤0.78, where TTL is a distance from an object-side surface of the first lens to the imaging plane and 2IMGHT is a diagonal length of the imaging plane, wherein a focal length of the first lens is within a range of 10 mm to 80 mm, wherein an absolute value of a radius of curvature of the image-side surface of the third lens is greater than an absolute value of a radius of curvature of an object-side surface of the second lens, and wherein T8<D34, where T8 is a thickness of the eighth lens and D34 is a distance from the image-side surface of the third lens to an object-side surface of the fourth lens.

2. The imaging lens system of claim 1, wherein the first lens has a convex object-side surface.

3. The imaging lens system of claim 1, wherein the second lens has a convex object-side surface.

4. The imaging lens system of claim 1, wherein the third lens has a convex object-side surface.

5. The imaging lens system of claim 1, wherein the seventh lens has a convex object-side surface.

* * * * *